United States Patent [19]
Maeda et al.

[11] Patent Number: 4,735,052
[45] Date of Patent: Apr. 5, 1988

[54] GAS TURBINE APPARATUS

[75] Inventors: Fukuo Maeda, Machida; Michio Watanabe, Ayase; Atsushi Narabe; Hiroya Sato, both of Yokohama, all of Japan

[73] Assignee: Kabushiki Kaisha Toshiba, Kawasaki, Japan

[21] Appl. No.: 899,994

[22] Filed: Aug. 22, 1986

[30] Foreign Application Priority Data

Sep. 30, 1985 [JP] Japan ............................... 60-216866
Jan. 22, 1986 [JP] Japan ................................. 61-11694

[51] Int. Cl.⁴ ............................................. F02C 7/22
[52] U.S. Cl. ...................................... 60/733; 60/746
[58] Field of Search ............... 60/39.281, 39.463, 737, 60/738, 746, 747, 733

[56] References Cited

U.S. PATENT DOCUMENTS

| 3,925,002 | 12/1975 | Verdouw | 60/737 |
| 4,112,676 | 9/1978 | DeCorso | 60/737 |
| 4,344,280 | 8/1982 | Minakawa et al. | 60/747 |
| 4,356,698 | 11/1982 | Chamberlain | 60/737 |
| 4,589,260 | 5/1986 | Krockow | 60/737 |
| 4,603,548 | 8/1986 | Ishibashi et al. | 60/746 |
| 4,683,715 | 8/1987 | Iizuka et al. | 60/733 |

FOREIGN PATENT DOCUMENTS 2082756 3/1982 United Kingdom ................ 60/746

Primary Examiner—Louis J. Casaregola
Attorney, Agent, or Firm—Schwartz, Jeffery, Schwaab, Mack, Blumenthal & Evans

[57] ABSTRACT

In a gas turbine apparatus of a premixed gas combustion type, a plurality of fuel supply systems are provided for supplying fuels to a combustion chamber of the gas turbine apparatus after the fuels are mixed with a high-pressure air, and the supply of fuels from the plurality of fuel supply systems is controlled according to programmed patterns which are predetermined for the fuel supply systems. According to a variation of the turbine load, the patterns of fuel supplies are executed in a transferred manner at a number of transfer points along a variation of the turbine load, with equal amounts of fuel reduced and increased stepwisely in the precedingly and subsequently executed patterns at each of the transfer points.

9 Claims, 16 Drawing Sheets

GAS TURBINE APPARATUS

BACKGROUND OF THE INVENTION

This invention relates to a gas turbine apparatus, and more particularly to a type thereof wherein the contents of nitrogen oxides ($NO_x$) and carbon monoxide (CO) in the exhaust gas are reduced by use of a so-called premixed fuel combustion method.

A conventional as turbine apparatus shown in FIG. 1, wherein an air compressor 2 compresses air 1 supplied from outside to a high-pressure, and the air 3 thus compressed is introduced into an annular chamber 5 surrounding a combustion cylinder 6, the chamber 5 and cylinder 6 constituting a combustion device 4. The high-pressure air cools the combustion cylinder 6 while it circulates through the annular chamber 5, and thereafter is introduced into the cylinder 6 through air supply ports 7 and a swirler 8.

Fuel supplied from a fuel supply (source, not) shown, is introduced through a fuel supply system 10 having a regulating valve 9, into the combustion cylinder 6 of the combustion device 4. The fuel thus introduced is injected into a reverse-flow region 12 within the cylinder 6 through one or more nozzles 11, and is ignited by an igniting device 13. After a continuous combustion of an amount of fuel at a constant pressure, a high temperature gas 14 is produced, and the gas 14 is supplied into a gas turbine 15 for operating the same. The driving force thus generated from the gas turbine 15 is partly consumed by the air compressor 2, while most part of the driving force is consumed for driving a driven device 16 such as a dynamo. The amount of fuel supplied to the combustion device 4 is controlled by controlling the opening of the regulating valve 9 provided in the fuel supply system 10 according to the load required for the driven device 16.

Regardless of the number of nozzles 11 provided for the cylinder 6, a large amount of so-called thermal $NO_x$ is ordinarily contained in the high temperature gas 14. By selecting a suitable number of nozzles and configuration of the ports 7, the temperature of the flame produced in the combustion cylinder 6 can be locally reduced, so that the amount of $NO_x$ thereby produced is somewhat reduced.

It has been found that a premixed fuel combustion method is advantageous for reducing flame temperature in the combustion cylinder 6. A relationship between $NO_x$ production and the mixing ratio of fuel to air is shown in FIG. 2. When the premixed gas combustion method is not used, the amount of $NO_x$ contained in the high temperature gas 14 increases exponentially as indicated by a curve 20 according to an increase in the fuel/air mixing ratio. On the other hand, when the premixed gas combustion is used, the amount of $NO_x$ is restricted as indicated by the curves $21a \sim 21d$ regardless of an increase in the fuel/air ratio, thus leading to a remarkable reduction of $NO_x$, and this effect appears more significant when the mixing ratio increases to $50 \sim 80\%$ (as shown by $21a \sim 21d$).

A conventional gas turbine utilizing the premixed fuel combustion is shown in FIG. 3. In this construction, fuel supplying systems 30 and 31 are provided, in which the system 30 is connected to the nozzle 11 so that the fuel is supplied directly into the combustion cylinder 6, while the system 31 supplies fuel to a premixing chamber 32 provided around the combustion cylinder 6, in which high-pressure air 3 has been supplied from the air compressor 2. The fuel thus supplied is mixed with high-pressure air 3, and the mixed gas 36 is introduced into the combustion cylinder 6 through the air supplying ports 7. The mixed gas 36 is ignited by a high-temperature gas produced by the fuel supplied from the fuel supplying system 30.

The contents of $NO_x$ and Co in the exhaust gas from the gas turbine 15 are varied as shown in FIG. 4 according to the variation in the turbine load. When the turbine load is a rated value (100%), both of the characteristic curve 37 showing the content of $NO_x$ and the characteristic curve 38 showing the content of CO are below the regulatory limits 39 and 40. However, when the load of the turbine is smaller than the rated value, being approximately equal to a transfer point C where the supply of fuel is transferred from the system 30 to the system 31, the contents of $NO_x$ and CO widely exceed the upper limits of the regulation. In particular, the content of CO increases at this point abruptly, thereby reducing the combustion efficiency of the combustion device 4, and the plant efficiency of the turbine apparatus is reduced. Furthermore, in a reduced load operation, a combustion vibration tends to occur in addition to the reduction of the combustion efficiency, and the reliability of the gas turbine is thereby reduced.

To alleviate this difficulty, an air by-pass conduit 34 having an air regulating valve 35 has been provided between the output of the air compressor 2 and the output side of the combustion cylinder 6. That is, by controlling the opening of the air regulating valve 35, the amount of the high-pressure air 3 supplied into the combustion cylinder 6 is controlled, and the fuel/air mixing ratio in the high-temperature gas 14 is maintained substantially constant, thereby reducing the $NO_x$ and CO densities in the exhaust gas.

In accordance with the above described procedure, the maximum contents of $NO_x$ and CO can be reduced less than the regulation limits 39 and 40. However, since the high-pressure air 3 of a comparatively low temperature is supplied into the high-temperature gas 14, such a procedure is not advantageous in view of the temperature distribution of the apparatus, and various problems tend to occur in the construction of the gas turbine.

SUMMARY OF THE INVENTION

An object of the invention is to provide a gas turbine apparatus, wherein the above described difficulties of the conventional construction can be substantially eliminated.

Another object of the invention is to provide a gas turbine apparatus of a premixed fuel combustion type wherein the fuel supply to the premixing stage of the apparatus is controlled according to a predetermined pattern.

Still another object of this invention is to provide a gas turbine apparatus wherein the amounts of fuel supplied from a plurality of fuel supply systems are controlled according to a variation of turbine load so that a predetermined premixing ratio between fuel and air can be obtained, and the temperature in the combustion cylinder can thereby be controlled to a suitable value adapted to reduce the $NO_x$ and CO densities in the exhaust gas.

A further object of this invention is to provide a gas turbine apparatus wherein setting of the operation patterns of the fuel supply systems, the number and positions of the transfer points of the systems operations and the like may be varied according to the kind of fuel and the operation conditions of the apparatus.

These and other objects of the invention can be achieved by a gas turbine apparatus of a premixed fuel combustion type comprising a plurality of fuel supply systems, the fuels being mixed with high-pressure air supplied from the systems, a combustion chamber where the fuels are burnt to produce a high-temperature gas for driving a gas turbine, a load detector for detecting the temperature of the high-temperature gas, a pressure sensor for detecting pressure vibration and combustion vibration in the combustion chamber, an exhaust gas sensor for detecting emission of nitrogen oxides ($NO_x$) and carbon monoxide (CO) in an exhaust gas from the gas turbine, a controller including a computer which, upon reception of outputs of the load detector and the sensors, calculates a total amount of fuel to be supplied, and executes predetermined fuel supplying patterns for the plurality of fuel supply systems, according to a program stored such that the executions of the patterns are transferred at a plurality of time points along an increase in the turbine load, with an equal amount of fuel being reduced and increased stepwise in the fuel supply of two seccessive fuel supplying patterns transferred at each of the plurality of time points, thereby reducing the $NO_x$ and the CO emission in the exhaust gas of the gas turbine.

The apparatus may otherwise be constructed such that the number and positions of the transfer points between successive fuel supply patterns as well as the equal amount of fuel to be reduced and increased at each transfer point are controlled according to the outputs of the pressure sensor and the exhaust gas sensor.

Alternatively, the gas turbine apparatus of the invention may be constructed such that the reduced and increased amounts in fuel supply at each transfer point are made equal to each other by adding a negative output signal obtained from a fuel supplying pattern for an unexecuted fuel supply system at the time of each transfer point to an output signal obtained from another fuel supplying pattern for a executed fuel supply system at the time of the transfer point.

DESCRIPTION OF THE PREFERRED EMBODIMENTS

Figure 1:
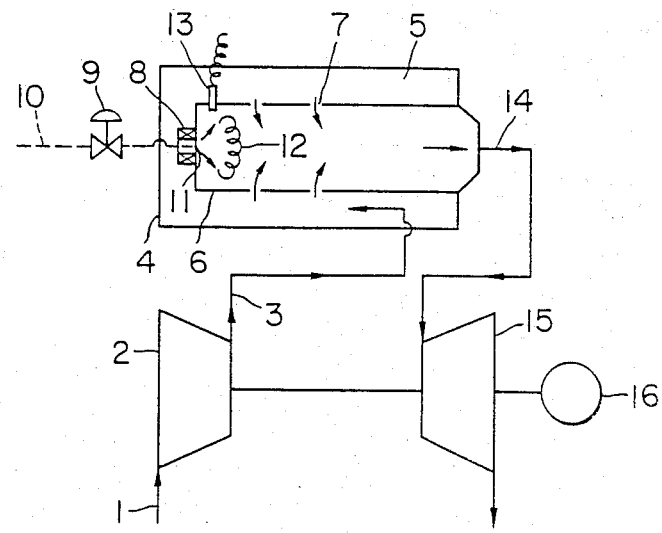
FIG. 1 is a diagram showing a basic construction of a conventional gas turbine apparatus.
Figure 2:
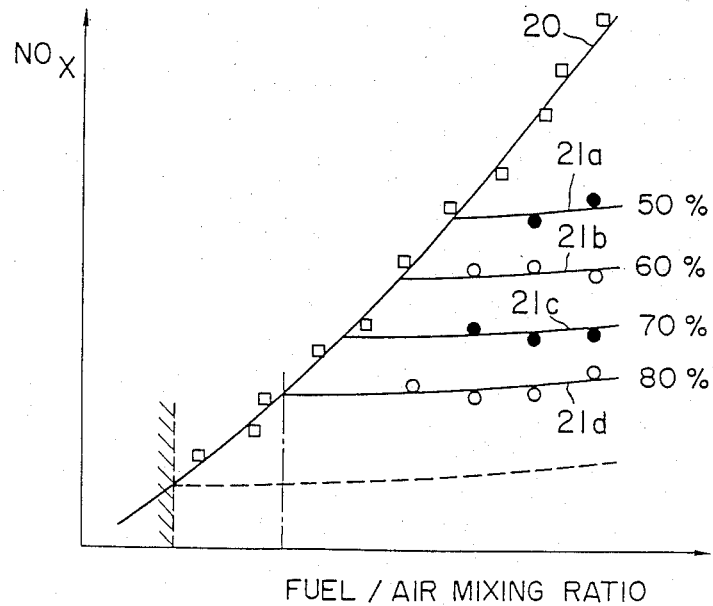
FIG. 2 is a graph showing the variation of $NO_x$ content when a premixed fuel combustion is utilized in such apparatus.
Figure 3:
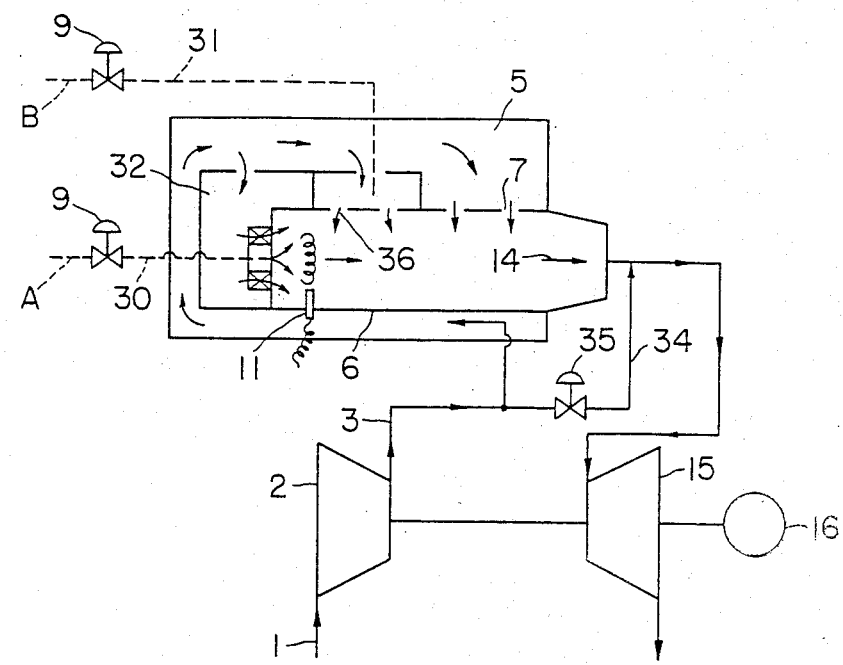
FIG. 3 is a diagram showing a conventional premixed fuel combustion type gas turbine apparatus.
Figure 4:
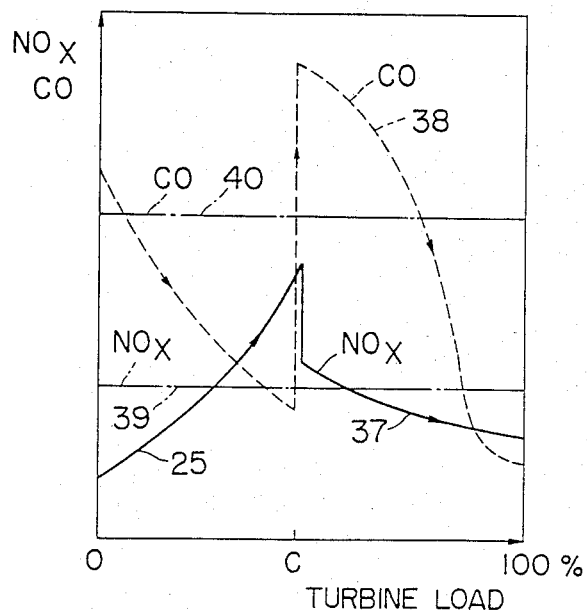
FIG. 4 is a graph showing the variation of $NO_x$ and CO contents when the load of the conventional gas turbine apparatus shown in FIG. 3 is varied.
Figure 5:
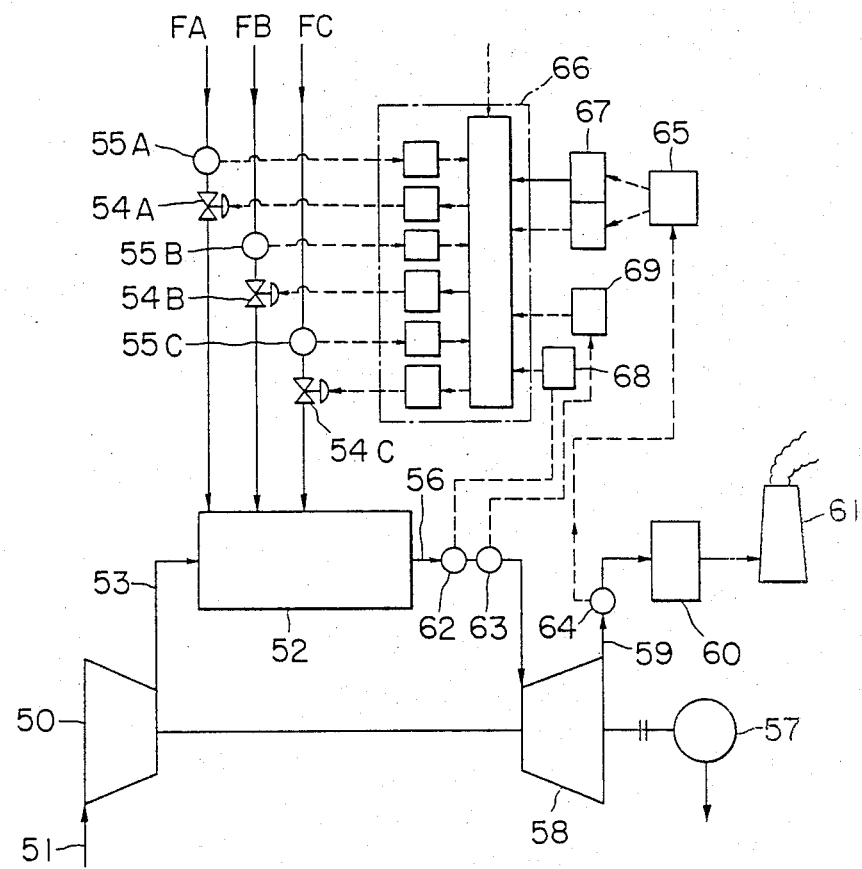
FIG. 5 is a block diagram showing a preferred embodiment of the present invention.

FIG. 5 illustrates a principal part of an embodiment of this invention. In the drawing, an air compressor 50 compresses air 51 introduced from outside, and delivers a high-pressure air 53 toward a combustion device 52. The combustion device 52 is of a premixed fuel combustion type having, for instance, three fuel supplying systems FA, FB and FC. Fuel regulating valves 54A, 54B and 54C and flowmeters 55A, 55B and 55C are provided in the fuel supplying systems FA, FB and FC, respectively, so that the amounts of fuel supplied through the fuel supplying systems FA, FB and FC are regulated as desired.

A high-temperature gas 56 delivered from the combustion device 52 is supplied to a turbine 58 directly coupled with a driven device 57 such as a dynamo for driving the same. One part of the driving force of the turbine 58 is used for driving the air compressor 50 as described above. The exhaust gas 59 from the turbine 58 is delivered through a heat-exchanger 60 and a stack 61 to the outside of the turbine 58.

Figure 6:
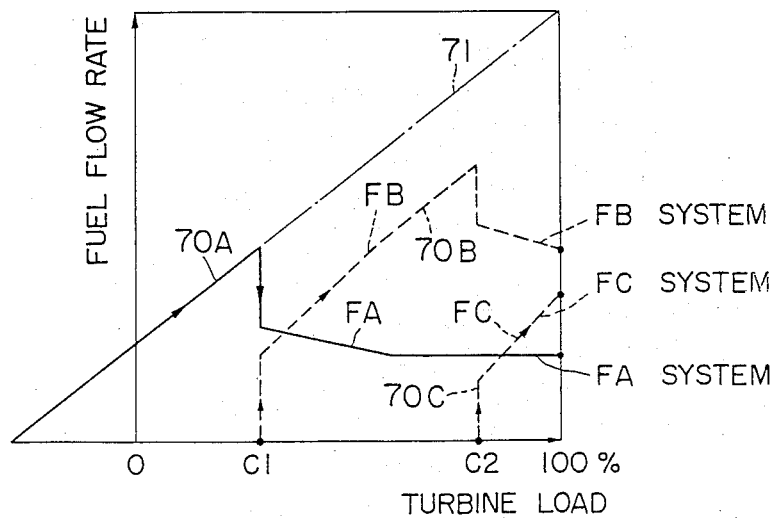
FIG. 6 is a diagram showing a fuel supply pattern programmed in the preferred embodiment shown in FIG. 5.

On the delivery side of the combustion device 52 are a pressure sensor 63 capable of detecting combustion vibration, and a temperature sensor 62 for detecting the temperature of the high-temperature gas 56. Likewise, on the exhaust side of the gas turbine 58 is an exhaust gas sensor 64 that samples the exhaust gas 59. The sampled gas from the sensor 64 is sent to an exhaust gas analyzer 65 for analyzing the contents of $NO_x$ and CO in the exhaust gas 59. Signal converters 67 convert the outputs of the exhaust gas analyzer 65 into electric signals readable by a computer 66, and send the signals to the input port of the computer 66. The input port of the computer 66 is further connected with converters 68 and 69 which convert the outputs of the temperature sensor 62 and the pressure sensor 63 into electric signals readable by the computer 66. The input port and output port of the computer 66 are further connected to the flowmeters 55A, 55B and 55C and the fuel regulating valves 54A, 54B and 54C of the fuel supplying systems FA, FB and FC, respectively. The computer 66 thus detects the amounts of fuel which are required to be supplied from the fuel supplying systems, and controls the fuel regulating valves 54A, 54B and 54C in accordance with programs stored in the computer 66. The programs stored in the computer execute fuel supply in patterns as shown in FIG. 6. More specifically, fuels are supplied from the fuel supply systems FA, FB and FC according to patterns 70A, 70B and 70C. That is, according to an increase in the turbine load, the fuel supply from the supply system FA according to the pattern 70A shown by a solid line is reduced in a stepwise manner at a transfer point C1, and the fuel supply from the system FB in the pattern 70B shown by dotted line rises up at the point C1 by an amount substantially equal to the reduced amount of the pattern 70B supplied from the fuel supply system FB. That is, after the transfer point C1, fuels are supplied from the fuel supply systems FA and FB simultaneously. When a second transfer point C2 is reached, the amount of fuel supply from the supply system FB is reduced sharply, and the pattern 70C supplied from the fuel supplying system FC rises up sharply by an amount substantially equal to the reduced amount of the pattern 70B.

The total sum of fuel supplied according to the patterns 70A, 70B and 70C from the fuel supply systems FA, FB and FC is thus held to be equal to an amount represented by a one-dot dash line 71 in FIG. 6. It should be noted that the total amount of the set value FT (see FIG. 7) differs depending upon the kind of fuel and the operating condition of the turbine. The aforementioned patterns 70A, 70B and 70C share the total amount of fuel FT among the fuel supply systems FA, FB and FC. When it is assumed that fa, fb and fc represent the shares of fuels among the patterns 70A, 70B and 70C, the total amount of fuel $Ft = fa + fb + fc$. Accordingly, when a different kind of fuel is used, the total amount of fuel Ft as well as the shares of fuels fa, fb and fc are varied. In the computer 66, various programs defining different total amounts of fuel FT are stored, and a program adapted for the kind of the fuel and the operating condition of the turbine is selected.

Figure 7:
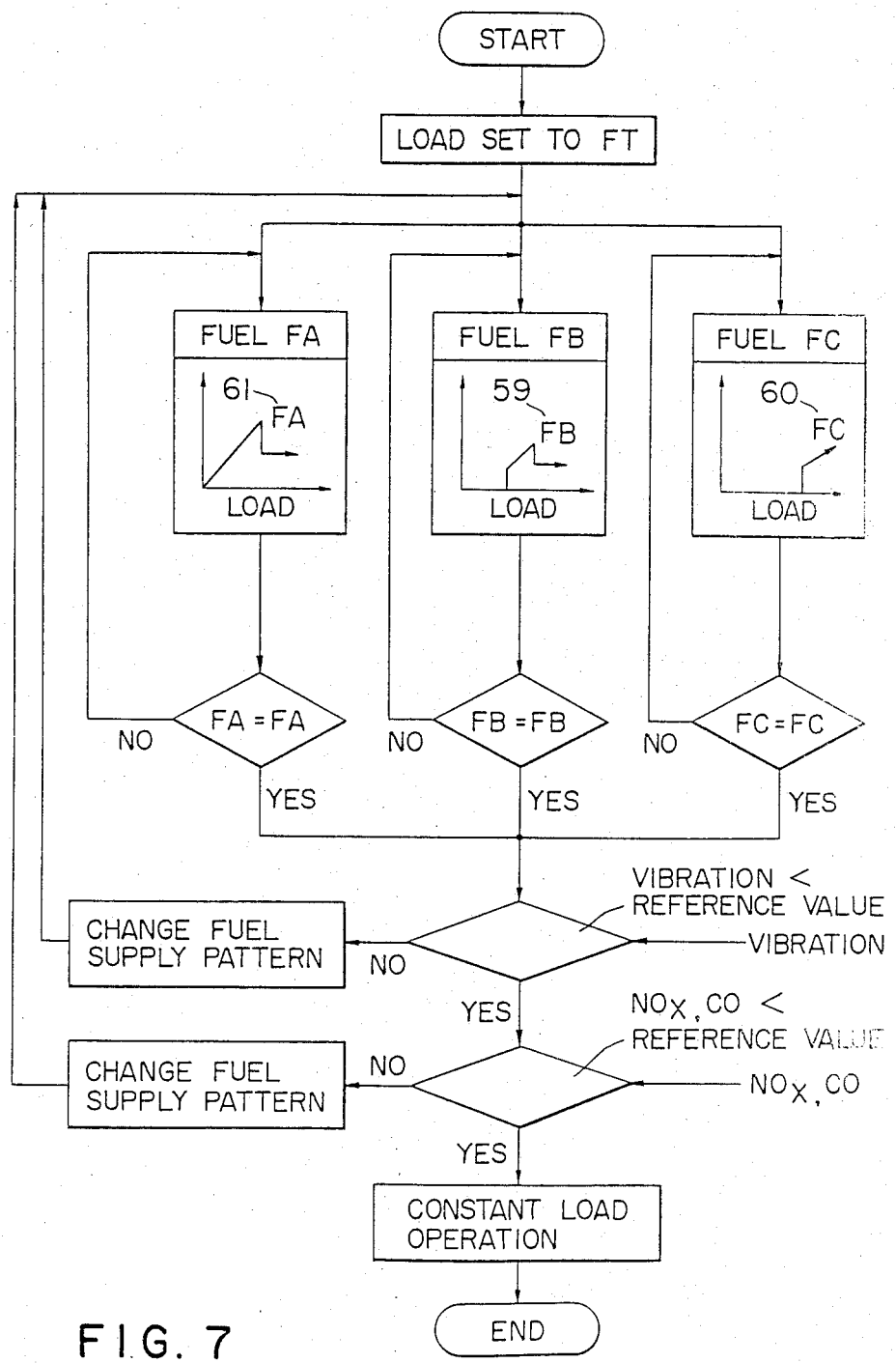
FIG. 7 is a flow chart showing the operation of the embodiment shown in FIG. 5.

A typical example of the program is illustrated in the flow chart shown in FIG. 7. As shown in the chart, when a turbine load is determined, the openings of the fuel regulating valves 54A, 54B and 54C of the fuel supply systems FA, FB and FC are controlled repeatedly until the programmed patterns of fuel supplies are achieved from the fuel supply systems FA, FB and FC.

Figure 8:
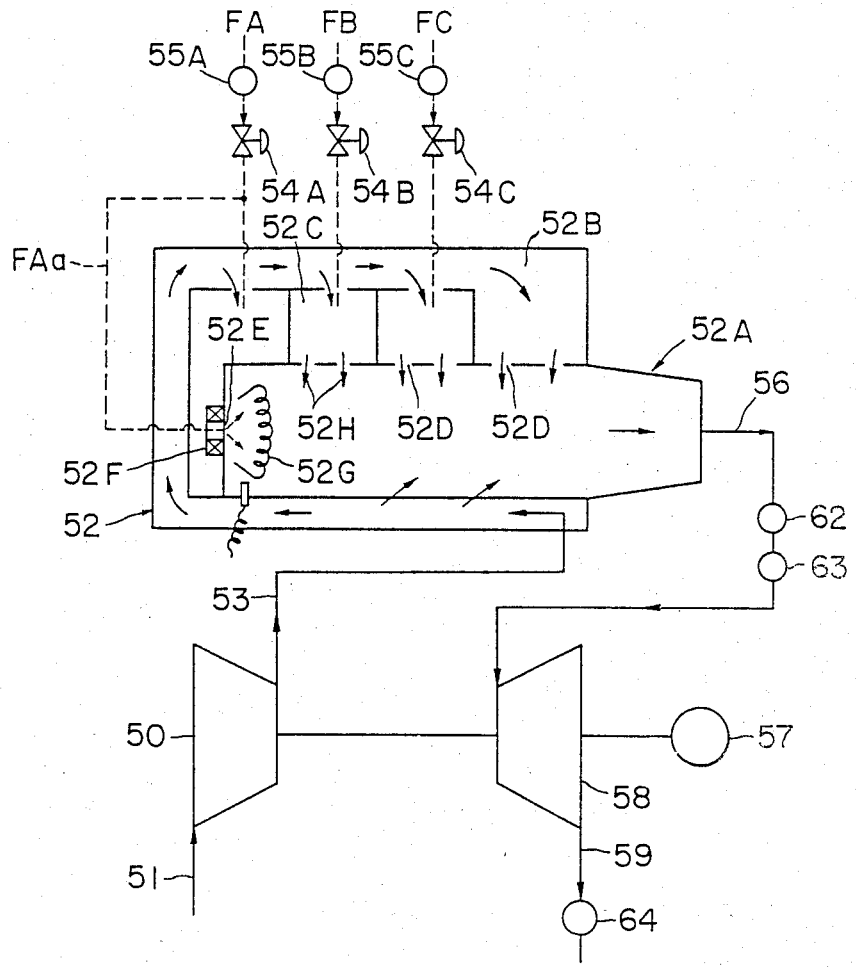
FIG. 8 is a diagram showing one part of the embodiment shown in FIG. 5 in more detail.

When the required amounts of fuels are supplied from the fuel supply systems FA, FB and FC to the combustion device 52, the amounts of fuels are first supplied into premixing chambers 52C provided in an annular space 52B formed around the combustion cylinder 52A provided in the combustion device 52 as shown in FIG. 8. In the premixing chambers 52C, the fuel is mixed with high-pressure air 53 which has passed around the combustion cylinder 52A for cooling the same. The mixture thus obtained in each chamber 52C is supplied into the combustion cylinder 52A through air supplying ports 52D.

In the combustion cylinder 52A, a part of fuel supplied from the fuel supplying system FA is introduced through a branched path FAa connected to a nozzle 52E, so as to create an expanded combustion, which is stably formed stably in a reverse-flowing region 52G by means of the nozzle 52 and a swirler 52F. Furthermore, since a jet flow 52H of the premixed gas flows against the reverse flowing region 52G in an arrow-marked direction indicated in FIG. 8, the aforementioned combustion is further stabilized. The combustion flame serves to ignite the premixed gas jet flow 52H subsequently flowing into the cylinder 52, and the combustion is successively expanded to the downstream side. The premixed gas if formed by mixing fuel at an equivalence ratio $\Phi$ in a range of from 0.5 to 0.7 with air. In this condition, the temperature of flame is comparatively low, and hence the creation of $NO_x$ is substantially less than that of the ordinary combustion. In addition, the low flame temperature reduces the temperature of the combustion cylinder 52, thus extending the operational life of the cylinder. Since the average flow speed of the premixed gas is each premix chamber 52C is larger than the turbulence flow combustion speed, the possibility of an occurrence of back-fire can be substantially reduced.

Figure 9:
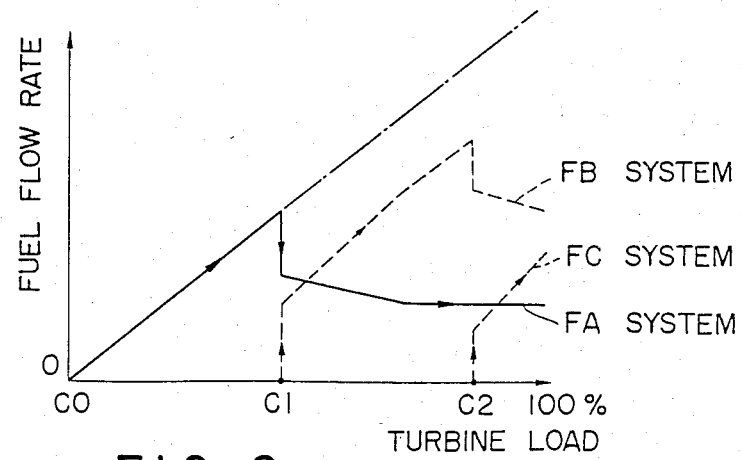
FIG. 9 is a diagram showing a variation of fuel supply in this embodiment when the load thereof is varied.

In the fuel supply systems FA, FB and FC, according to an increase of the turbine load, the fuel regulating valves 54A, 54B and 54C are opened successively as shown in FIG. 9, so that an amount of the fuel adapted to a turbine load is supplied to the combustion device 52. The reason why the regulating valves 54B and 54C are opened abruptly at the initiating instant of the operation is as follows. If the valves 54B and 54C are opened gradually, the amounts of fuel supplied therethrough increase slowly because of the high pressure air in the chambers 52C, and incomplete combustion tends to occur in the combustion cylinder 52A. However, where the fuel supply from the systems FB and FC are increased abruptly as shown in FIG. 9, the driving force of the turbine 58 increases excessively. To prevent such an increase, it is so arranged that when the fuel supply from the system FB increases abruptly, the fuel supply from the system FA is reduced by the same amount quickly, and when the fuel supply from the system FC increases abruptly, the fuel supply from the system FB is reduced by the same amount quickly. Furthermore, since the first and second transfer points C1 and C2 are appropriately according to the programs as shown in FIG. 7, peak values $NO_{xp}$ and $CO_p$ of the amounts of $NO_x$ and CO can be reduced as shown in FIG. 10.

More specifically, at the transfer points C1 and C2, the supplies of fuels from the fuel supply systems FB and FC are started, and since this is at the starting times of the fuel supply, the combustion is effected under a scarce fuel condition so that peak values $CO_p$ and $NO_{xp}$ tend to occur. However, because of the abrupt increase of the fuel supply at these points and also because of the temperature rise of the gas delivered from the combustion cylinder 52A according to the increase in turbine load, the content of CO is reduced while the content of $NO_x$ is increased. The gas delivered from the combustion cylinder 52A is sent through the temperature sensor 62 and the pressure sensor 63 to the gas turbine 58. The signal converters 68, 69 convert the outputs of the sensors 62 and 63 into signals readable by the computer 66, and apply the signals to the input ports of the computer 66 as described hereinbefore. The computer 66 detects the temperature of the combustion gas supplied to the gas turbine 58, calculates the turbine load from the temperature, and controls the regulating valves 54A, 54B and 54C of the fuel supply systems FA, FB and FC according to the load. Furthermore, the computer 66 compares the outputs of the pressure sensor 63 and the exhaust gas analyzer 65 with the preset values of the combustion vibration and the $NO_x$ and CO densities, and when the detected values exceed the preset values, the computer 66 changes the positions of the first and second transfer points along the turbine load, and also changes the fuel increasing or decreasing amounts at the transfer points C1 and C2. In this manner, the temperature of the flame can be varied suitably, and the combustion vibration level of the turbine as well as the $NO_x$ and CO emission in the exhaust gas from the turbine can be controlled advantageously.

Figure 10:
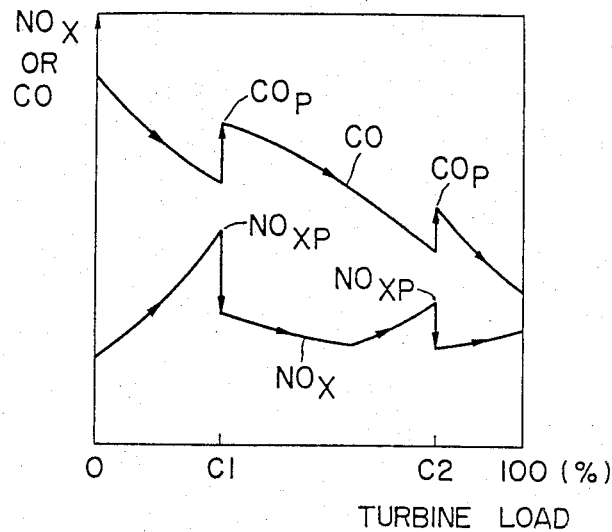
FIG. 10 is a graph showing the variations of $NO_x$ and CO densities in the exhaust gas, when the load of the embodiment shown in FIG. 5 is varied.
Figure 11:
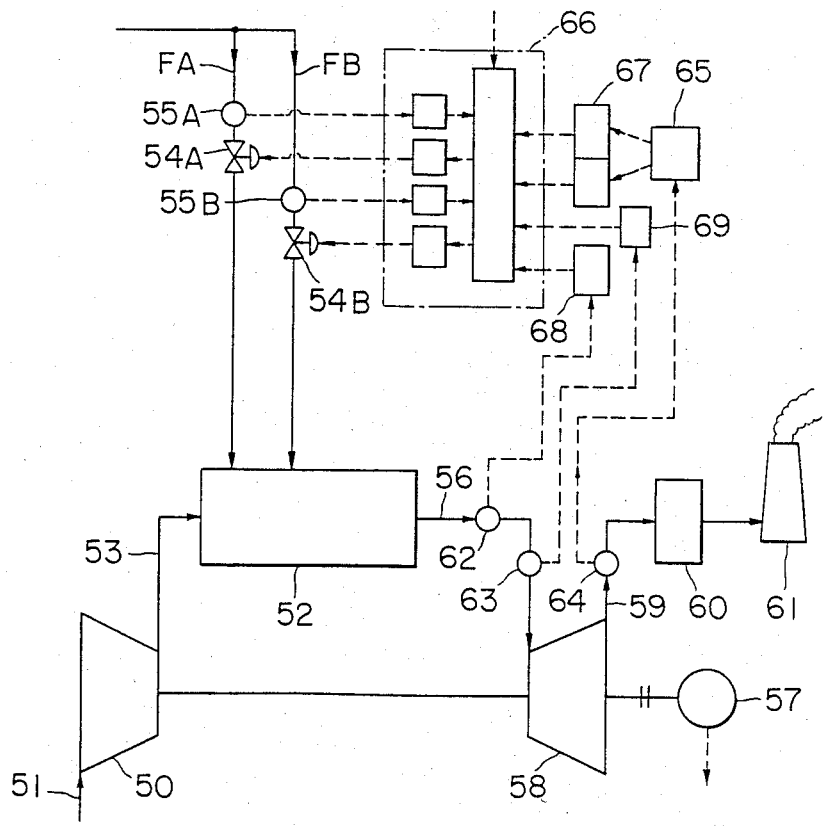
FIG. 11 is a block diagram showing a modification of the embodiment shown in FIG. 10.

FIG. 11 illustrates a modification of the embodiment shown in FIG. 10 wherein the number of the fuel supply systems is reduced to two systems FA and FB, and component circuits related to the system FC are thereby omitted. All the members other than those described above are left unchanged, and further detailed description thereof is omitted. In this modification, since the fuel supply systems are reduced to FA and FB, and only one transfer point, C1, is provided, the construction of the gas turbine as well as the program to be stored in the computer 66 can be substantially simplified.

Figure 12:
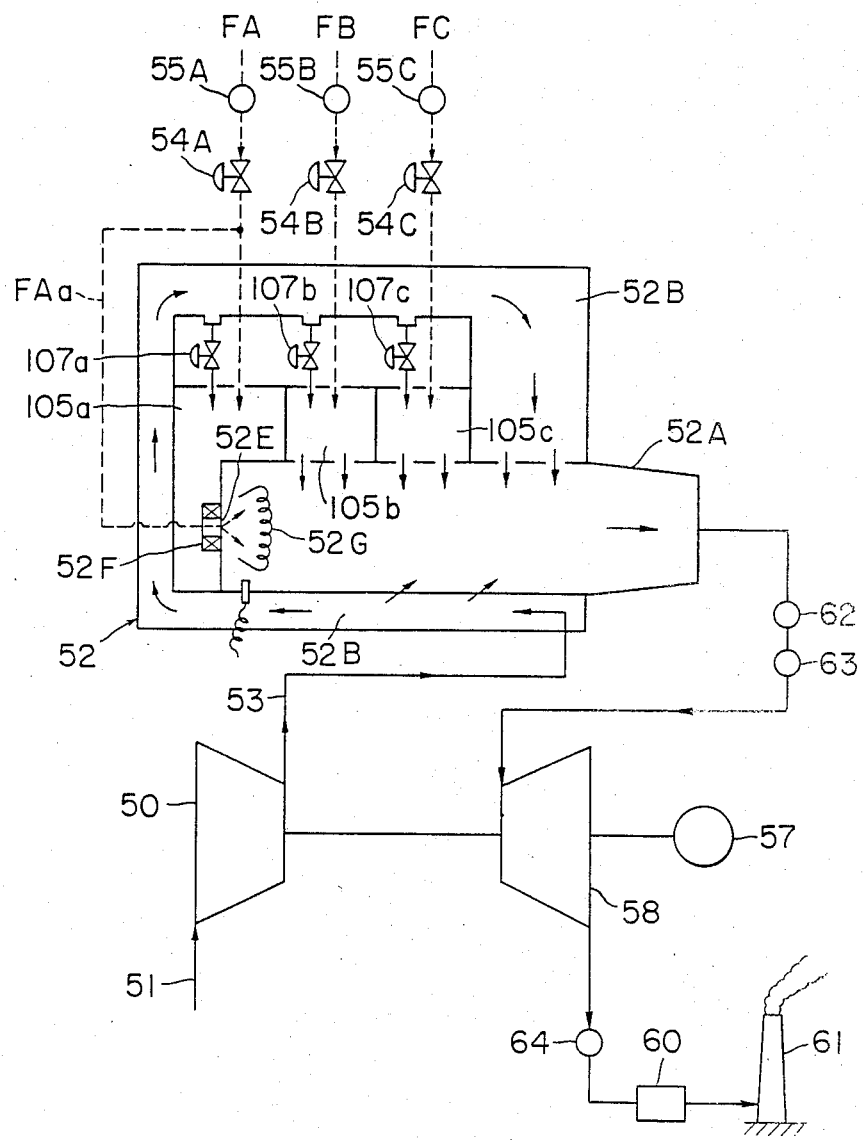
FIG. 12 is a block diagram showing a second embodiment of this invention.
Figure 13:
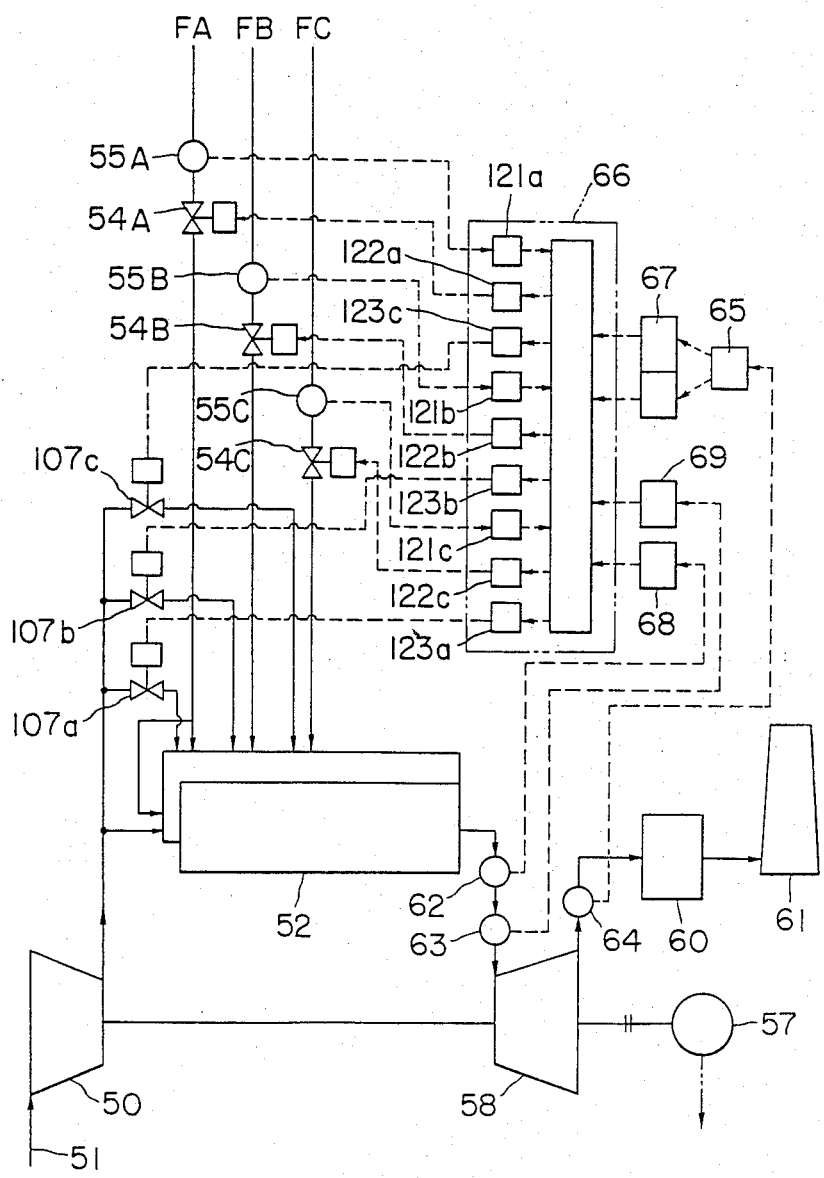
FIG. 13 is a diagram showing a control system of this embodiment in more detail.

FIGS. 12 and 13 illustrate another embodiment of the present invention wherein similar members as those in FIGS. 5 and 8 are designated by similar reference numerals, and detailed descriptions thereof are omitted. The only difference between this embodiment and the previous embodiment shown in FIGS. 5 and 8 is that premixing chambers 105a, 105b and 105c are provided between the annular space 52B filled with the high-pressure air supplied from the air compressor 50, and the combustion cylinder 52A, and high-pressure air regulating valves 107a, 107b and 107c are provided between the annular space 52b and the premixing chambers 105a, 105b and 105c, respectively. In order to control the high-pressure air regulating valves 107a, 107b and 107c under the control of the computer 66, a set of converters 123a, 123b and 123c are provided in the computer 66. Furthermore, another set of converters 122a, 122b and 122c are provided in the computer 66 for controlling the openings of the regulating valves 54A, 54B and 54C of the fuel supplying systems FA, FB and FC, and still another set of converters 121a, 121b and 121c are provided in the computer 66 for receiving the outputs of the flowmeters 55A, 55B and 55C measuring the amounts of fuel supplied by the fuel supplying systems FA, FB and FC.

Figure 14:
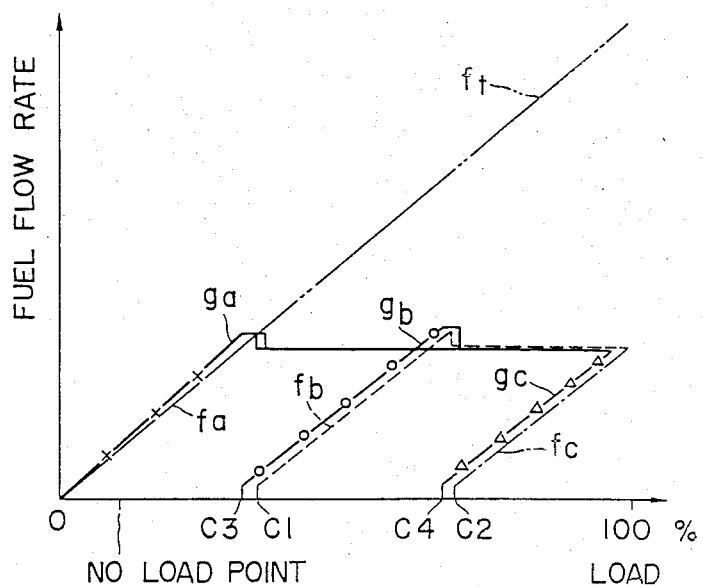
FIG. 14 is a diagram showing a fuel supply pattern and a high-pressure air supply pattern to be used in the second embodiment.

The computer 66 of this embodiment includes function generators 124a, 124b and 124c capable of setting fuel supplying patterns showing the variations of the fuel amounts fa, fb and fc supplied from the fuel supplying systems FA, FB and FC. According to the increase of the turbine load, the amount of fuel fa increases initially, and then the amounts of fuels fb and fc start to increase at the first and second transfer points, respectively, as shown in FIG. 14. The first and second transfer points C1 and C2 are shiftable as desired along the turbine load increasing axis.

At the first transfer point C1, the amount of fuel fa is stepwise reduced as indicated by a solid line, by an amount corresponding to the stepping-up amount of the fuel fb which is indicated by a dash line. After the first transfer point C1, the fuels fa and fb are supplied from the fuel supply systems FA and FB simultaneously. At the second transfer point C2, the amount of fuel fb is stepwise reduced, while the amount of fuel fc increases in a stepwise manner as shown by one-dot-dash line. The stepwise increased amount of fc is made equal to the stepwise reduced amount of fb, so that the total sum of the amounts of fuels fa+fb+fc is made equal to ft, which is indicated by two-dot dash line shown in FIG. 14. When the kind of the fuel or the way of operation of the turbine is varied, the total sum ft of the fuel is varied as well as the amounts of fuels fa, fb and fc.

On the other hand, the amounts of air ga, gb and gc supplied through the regulating valves 107a, 107b and 107c are controlled in accordance with the amounts of fuels fa, fb and fc. In this case, the supply of gb obtained by a stepwise opening of the air supply valve 107b is effected at a point C3 a little earlier than the first transfer point C1. The air supply valve 107b is held in nearly full-opening state until the fuel regulating valve 54b opens sufficiently, and after the supplied amount fb is stepwise reduced, the air supply valve 107b is closed in a stepwise manner, so that the amount of air adapted to the fuel fb supplied thereafter is supplied from the air regulating valve 107b. The amount of air gc supplied from the air valve 107c is controlled in a similar manner as described above, and is supplied stepwise at a point C4 a little earlier than the transfer point C2 and stepwise reduced after the reduction of fuel supply fc.

Figure 15:
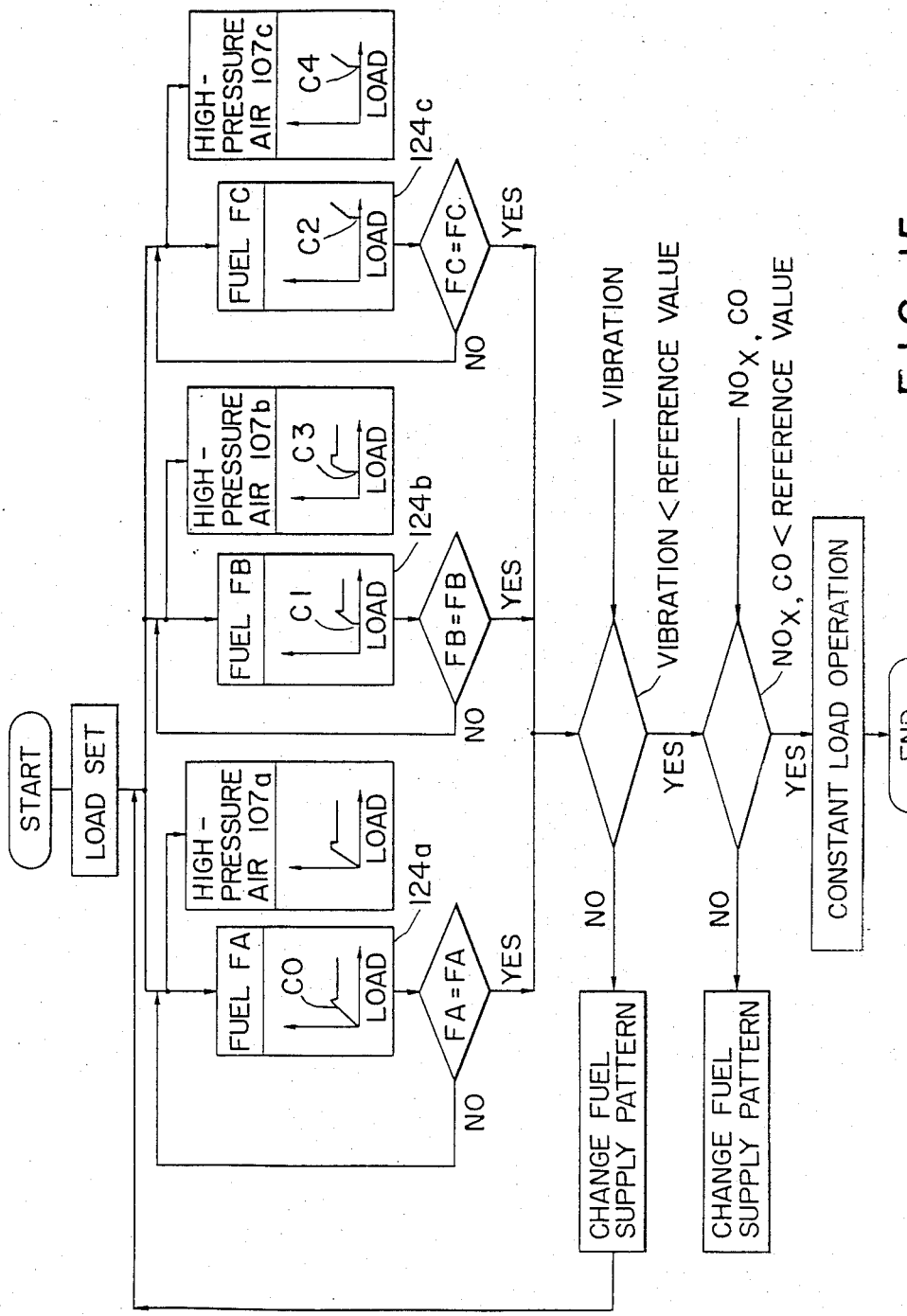
FIG. 15 is a flow chart showing the operation of the second embodiment.

The aforementioned control of the fuel regulating valves 54a, 54b and 54c and the air regulating valves 107a, 107b and 107c is executed in accordance with a program stored in the computer 66. When a desired turbine load is set as shown in FIG. 15, fuel supply from the fuel supply systems FA, FB and FC and air supply from the compressor 50 into the premixing chambers are effected in accordance with fuel supplying patterns and high-pressure air supplying patterns defined by the program stored in the computer 66, and the opening controls of the fuel regulating valves 54A, 54B and 54C and the air regulating valves 107a, 107b and 107c are carried out until the turbine load reaches the set valve. When the fuel is supplied from the fuel supplying systems FA, FB and FC into the combustion device 52, the fuel is introduced into the premixing chambers 105a, 105b and 105c, and mixed with the high-pressure air supplied through the valves 107a, 107b and 107c in the premixed chambers. From these premixed fuels, one fuel provided in the premixing chamber 105a is forced into the combustion clyinder 52A through a nozzle or nozzles 52E and the swirler 52F so that a stable flame is formed in a reverse flow region 52G. The premixed fuels in the premixing chambers 105b and 105c are forced through the ports 52D into the combustion cylinder 52A in the form of jet flow 52H in an opposite direction to that of the reverse flowing region 52G. The flame formed in the reverse flow region 52G serves as an ignition source to the premixed fuels flowing into the cylinder 52A through the ports 52D.

The equivalence ratio $\Phi$ of the premixed fuels is obtained in a scarce fuel condition of, for instance, $\Phi = 0.5 \sim 0.7$ so that the flame temperature is comparatively low, thereby providing a comparatively low temperature of the combustion cylinder 52A, and extending the operational life of the cylinder accordingly. Furthermore, the average speed of the mixed fuel in each premixing chamber is made larger than turbulence flow combustion speed, and hence the possibility of back-fire can be substantially reduced.

Figure 16:
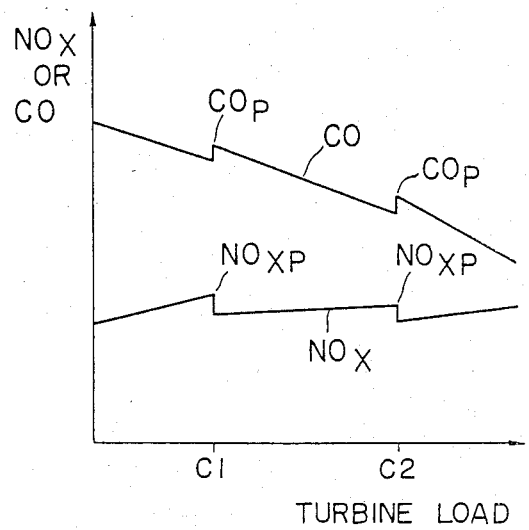
FIG. 16 is an explanatory diagram showing the generation of CO and $NO_x$ according to the variation of the turbine load in this embodiment.

Since the fuel is supplied from the fuel supply systems FA, FB and FC into the combustion cylinder 52A, the first and second transfer points C1 and C2 are selected at positions along the load variation axis where additional amounts of fuel fb and fc are supplied, and the peak value $NO_{xp}$ of $NO_x$ and the peak value $CO_p$ of CO density at the time of a fractional load operation of the turbine are both reduced as shown in FIG. 16.

The transfer points C1 and C2 correspond to increase points of the fuel supply from the fuel supply systems FB and FC. Before the transfer points C1 and C2, a high-pressure air is supplied so that at an initial period of increase of fuel supply at these points, the amount of fuel becomes scarce, and the peak value $CO_p$ of CO rises up abruptly at these points. However, according to an increase of the fuel supply, the density of CO is reduced gradually because of a temperature rise in the delivery part of the combustion cylinder 52A. On the other hand, the content of $NO_x$ is varied in reverse proportion to CO density. In both cases, the $NO_x$ and CO contents have double-peak characteristics, and are reduced as a whole. The high-temperature gas with $NO_x$ and CO contents thus reduced is sent to the gas turbine 58 for operating the same.

When the high-temperature as is supplied to the gas turbine 58, the temperature of the gas is detected by the temperature sensor 63 while the presence or absence of the combustion vibration is detected by the pressure sensor 62. The detected results are sent to the computer 66. The computer 66 thus calculates the turbine load based on the detected temperature of the high-temperature gas, and controls the fuel supply systems FA, FB and FC so as to supply fuel adapted to the turbine load. Furthermore, the computer 66 compares the detected values of the pressure sensor 62 and the exhaust gas sensor 64 with the set values of the combustion vibration and the $NO_x$ and CO densities, and when the detected values exceed the set values, the supplied amounts of fuel at the transfer points C1 and C2 are adjusted suitably for changing the flame temperature in the combustion cylinder 52A, whereby the combustion vibration as well as the $NO_x$ and CO are controlled.

Figure 17:
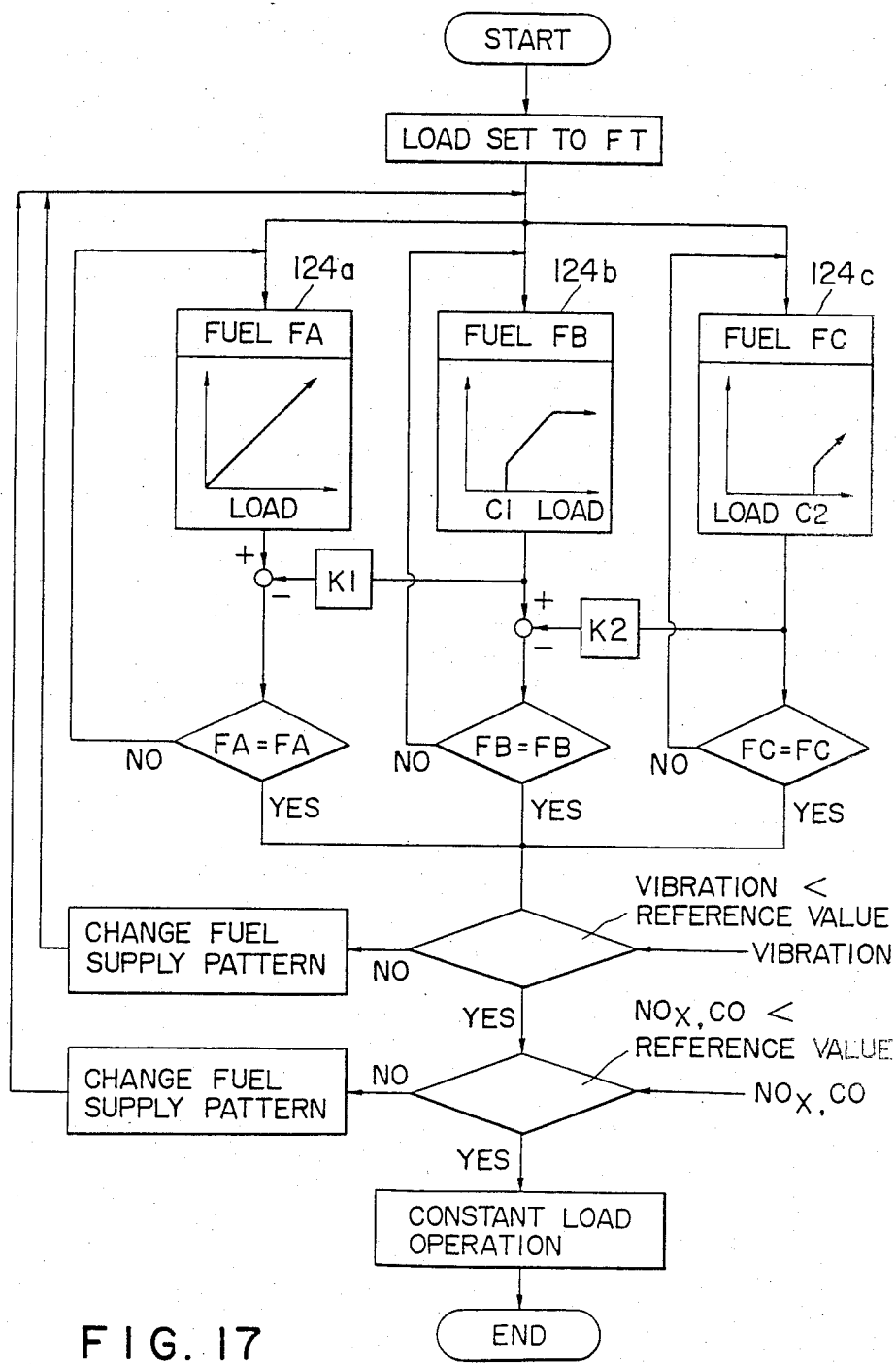
FIGS. 17 and 18 are flow charts for explaining the operation of modifications of the second embodiment.
Figure 18:
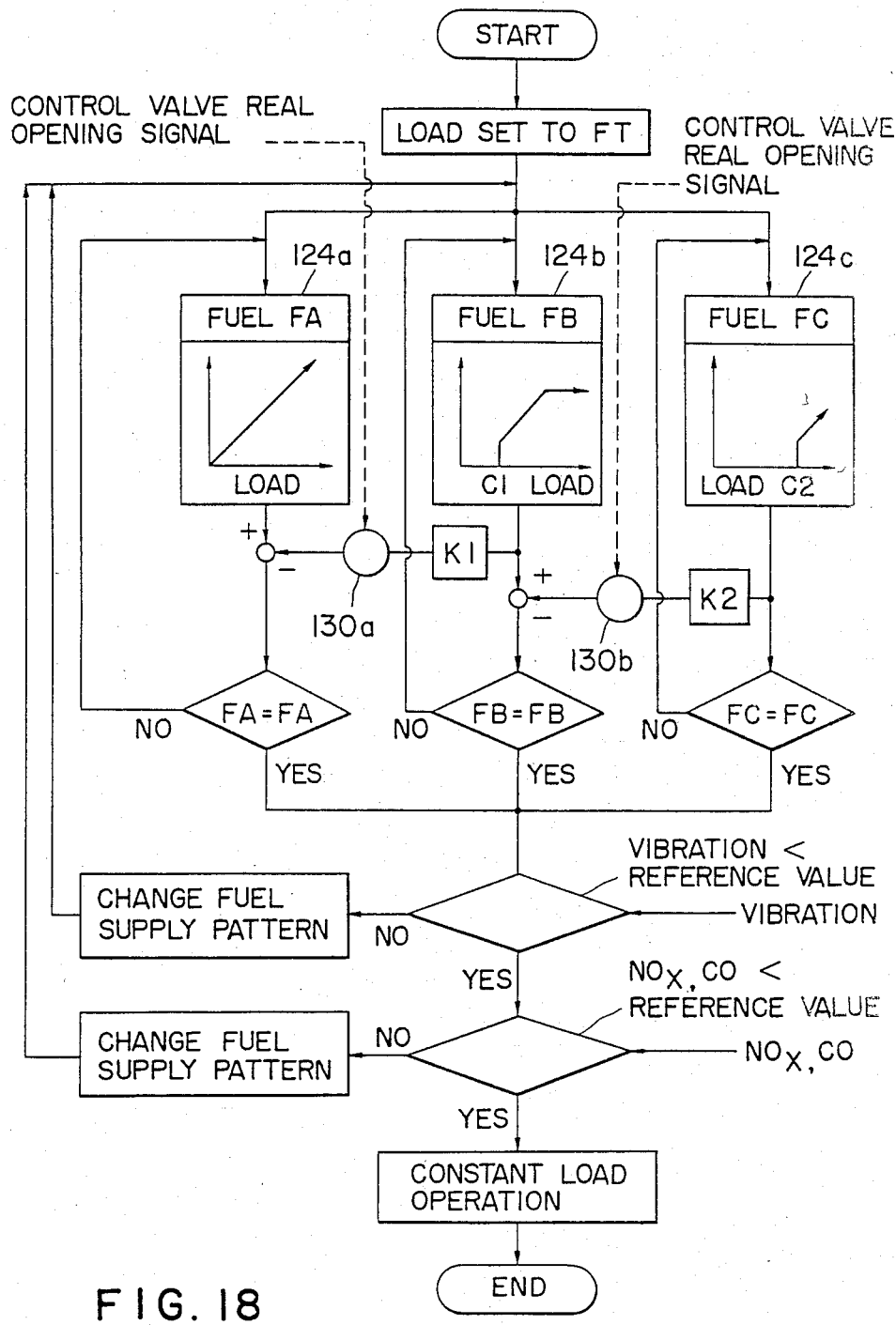

FIGS. 17 and 18 illustrate modifications of the above described embodiment shown in FIGS. 12 through 16.

In the modification shown in FIG. 17, the function generator 124a generates a signal which controls the fuel supply system FA so as to supply an amount of fuel fa which increases constantly according to an increase of the turbine load. On the other hand, in the function generator 124b, there is provided a signal which controls the fuel supply system FB to supply an amount of fuel fb which steps-up from zero at the first transfer point C1, and then increases linearly according to an increase in the turbine load, but which is then maintained at a constant value after the second transfer point C2. Likewise, in the function generator 124c, there is provided a signal which controls the fuel supply system FC to supply an amount of fuel fc which steps-up from zero at the second transfer point C2, and then increases linearly according to an increase in the turbine load.

When the operation of the turbine starts, and the set value FT increases linearly, the amount of fuel fa corresponding to the signal generated in the function generator 124a is supplied from the system FA to the combustion device 52. Thereafter when the first transfer point C1 is reached, the second function generator 124b starts to operate, and the amount of fuel fb corresponding to the signal thereof is supplied from the fuel supply system FB to the combustion device 52.

Between the first and second transfer points C1 and C2, the signal generated in the function generator 124b is not only used for controlling the valve 54B, but is multiplied by a constant gain $K_1$, and the product thus obtained is added as a negative signal to the signal for obtaining fa generated from the function generator 124a. Accordingly, the control signal to be applied to the fuel supplying system FA is reduced to $FA = fa - K_1 \cdot fb$, and the amount of fuel controlled by this reduced signal is supplied to the combustion device 52. When $K_1$ is assumed to be 1, the sum of the amount of fuel supplied from the system FA and that supplied from the system FB is made equal to the total amount of fuel.

When the second transfer point C2 is reached, the third function generator 124c operates, and the fuel from the fuel supply system FC is supplied under the control of the fuel regulating valve 54C to the combustion device 52. Simultaneously, the signal generated from the third function generator 124c is multiplied by another constant gain $K_2$, and the product thus obtained is added to the output signal from the second function generator 124b as a negative signal. That is, the regulating valve 54B is controlled by a signal $FB = fb - K_2 \cdot fc$. the above described opening controls of the regulating valves are repeated until the amounts of fuels supplied from the fuel supply systems FA, FB and FC are made equal to the set values. When the constant gain $K_2$ is assumed to be 1, the amounts of fuels supplied from the fuel supply systems FA, FB and FC during the period from the second transfer point C2 to the rated load operation are represented by (fa−fb), (fb−fc) and (fc), and hence the total sum of the supplied fuels is made equal to fa which coincides with the program set in the first function generator 124a. Furthermore, at the first and second transfer points C1 and C2, the amount of fuel, the supply of which has been stepwise reduced, is made equal to the amount of fuel to be subsequently supplied in a stepwise manner. As a consequence, an abrupt variation of total amount of fuel does not occur, and the supply of the sum of the fuels is increased according to a predetermined schedule.

FIG. 18 illustrates another modification of the embodiment shown in FIGS. 12~16, wherein similar members are designated by similar reference numerals, and further descriptions thereof are omitted.

In the modification, switches 130a and 130b, which are normally in an opening state, are provided in the negative signal supplying circuits of FIG. 17, respectively. When the first transfer point C1 is reached, the switch 130a is brought into a closed state by the introduction of a signal representing that the fuel regulating valve 54B of the fuel supply system FB has been transferred from the fully closed state to an opening state. Likewise, when the second transfer point C2 is reached, the switch 130b is closed by the introduction of a signal representing that the fuel regulating valve 54C of the fuel supply system FC has been transferred from the fully closed state to an opening state. As a consequence, the aforementioned negative signals such as $-K_1 \cdot fb$ and $-K_2 \cdot fc$ are added to the output signals fa and fb from the first and second function generators 124a and 124b at the first and second transfer points C1 and C2, respectively, and the aforementioned possibility of a temporary reduction of the total sum of the supplied fuels from the set value can be reliably eliminated, while the possibility of lost-ignition and the increase of the $NO_x$ and CO emission can also be thereby prevented.

As is apparent from the above described embodiments, the peak values of the CO and $NO_x$ emission are reduced when the number of the premixing fuel supply systems such as FA, FB and FC increases. However, the increase of the fuel supply systems complicates the construction of the gas turbine apparatus, and requires complicated control programs for controlling these fuel supply systems.

Figure 19:
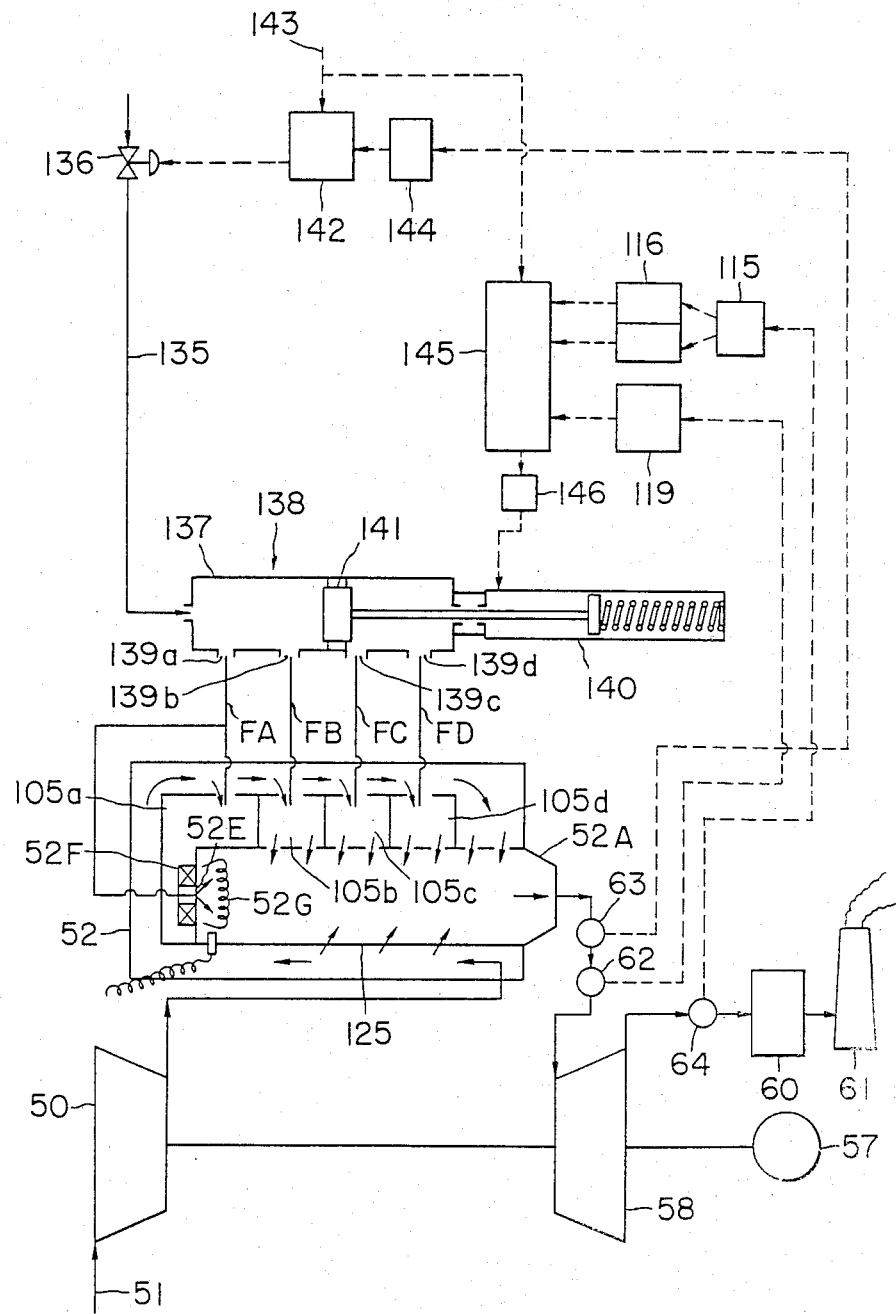
FIG. 19 is a block diagram showing a third embodiment of the invention.

FIG. 19 illustrates still another embodiment of the present invention wherein the above described complicated programs are not required regardless of an increased number of the fuel supply systems. In this embodiment, a single fuel supply tube 135 is provided with a fuel control valve 136 which controls the fuel supplied to the combustion device 52 as desired. The lower end of the tube 135 leading to the combustion device 52 is connected to one end of a fuel distributor 138 having a cylindrical body 137. Along one side of the cylindrical body 137 are arranged in spaced relation, a plurality of holes 139a, 139b, 139c and 139d which are communicated with a plurality of premixing fuel supply systems FA, FB, FC and FD connected with the corresponding number of premixing chambers 105a, 105b, 105c and 105d. In the cylindrical body 137 is a valve body 141 which is shiftable along the axial direction of the body 137 by means of an acutator 140 for opening or closing the holes 139a, 139b, 139c and 139d. The opening areas of the holes 130a~139d are selected, for instance, in a ratio of 1:2:3:4 (see FIG. 20), so that an optinum amount of fuel is supplied therethrough to each of the fuel supply systems FA, FB, FC and FD.

On the other hand, the fuel control valve 136 is controlled by a fuel regulator 142 having two inputs, one being applied with a load setting signal, while the other being applied, through a converter 144, with an output of the load detector indicative of an acutal load of the gas turbine 58. The fuel regulator 142 compares the two input signals, and delivers an instruction signal for controlling the opening of the fuel control valve 136. The output signals from the pressure sensor 62 and the exhaust gas analyzer 115 are applied through converters 119 and 116 to a fuel distribution controller 145. The load setting signal 143 is also applied to the fuel distribution controller 145, and an opening instruction signal for the fuel distributor 138 which is calculated in the controller 145 is applied through a converter 146 to the fuel distributing actuator 140.

Figure 21:
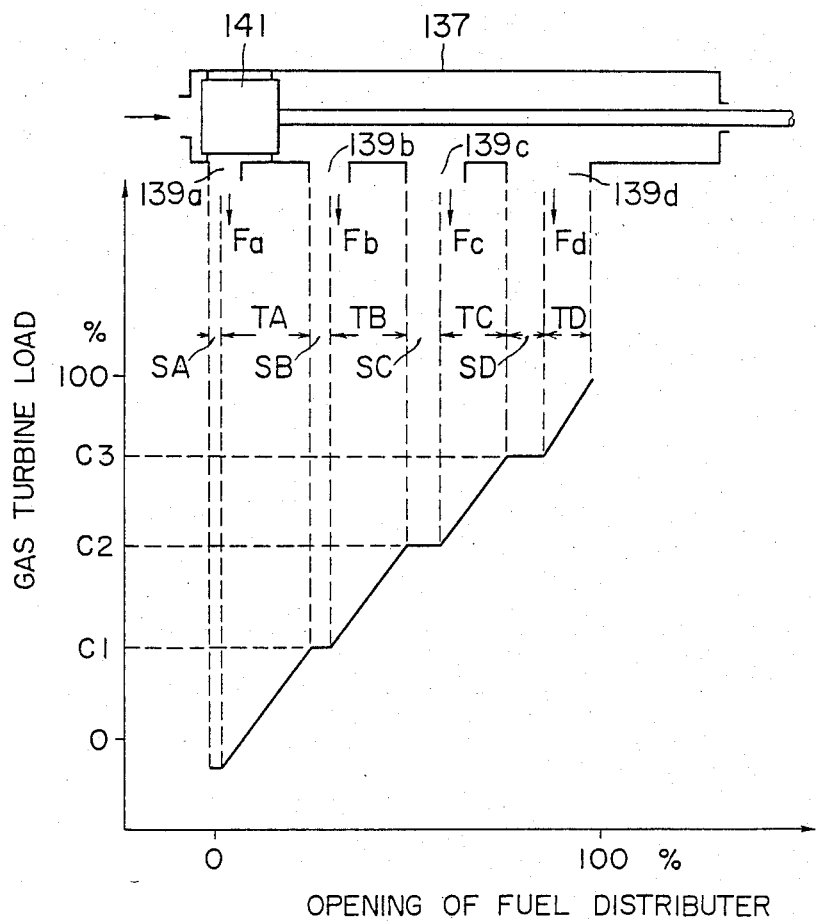

The fuel distribution controller 145 stores a program having a turbine load-fuel distribution pattern as shown in FIG. 21. Thus, in accordance with the turbine load, the position of the valve body 141 of the fuel distributor 138 is determined, thereby determining the holes thereof to be opened.

More specifically, when the load setting signal 143 is applied to the fuel regulator 142 and the fuel distribution controller 145, the opening of the fuel control valve 136 is controlled, and an amount of fuel thus controlled flows into the fuel distributor 138. The fuel flowing into the distributor 138 first flows through the hole 139a into the premixing chamber 105a wherein the fuel is mixed with the high-pressure air and is burnt in the combustion cylinder 52A. When the set load of the turbine further increases, the distribution actuator 140 is operated under the control of the fuel distribution controller 145, so that the valve body 141 is shifted rightward as viewed in FIG. 19. When the turbine load reaches the first transfer point C1, the valve body 141 abruptly opens the hole 139b to a predetermined opening state, thereby supplying fuel from the first and second fuel supply systems FA and FB to the combustion device 52. In this case, since the total amount of fuel supplied to the fuel distributor 138 is independently controlled by the fuel control valve 136 to be a value corresponding to the turbine load setting signal 143, the amount of fuel supplied from the fuel supply system FA is stepwise reduced by an amount equal to an amount increasingly supplied from the second fuel supply system FB. In other words, in the case where fuel starts to be supplied from the fuel supply system FB, the amount of fuel supplied from the first fuel supply system FA is reduced accordingly, so that the total amount of fuel supplied to the combustion device 52 is maintained at a constant value.

When the load setting value further increases, the fuel control valve 136 is controlled in the opening direction until the second transfer point C2 is reached, and the amount of fuel supplied to the combustion device 52 is increased by an amount corresponding to the set value.

When the second transfer point C2 is thereafter reached, the hole 139c of the distributor 138 is opened in the same manner as described above, and fuel is supplied from the first, second and third fuel supply systems FA, FB and FC simultaneously. A similar operation is thereafter repeated when a further transfer point is reached.

Figure 22:
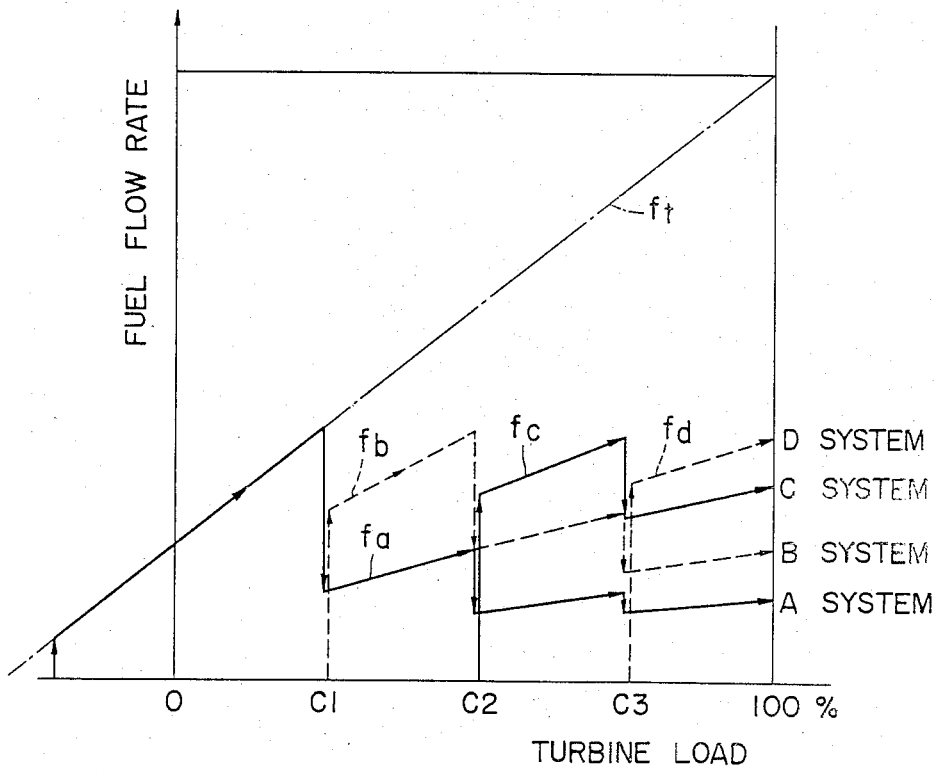

FIG. 22 illustrates variations of fuel supplied from the fuel supply systems FA, FB, FC and FD to the combustion device 52. Furthermore, SA, SB, SC and SD in FIG. 21 represent the ranges, in which the fuel distributor opens the holes in a stepwise manner, while TA, TB, TC and TD represent ranges where the control is carried out continuously.

Figure 23:
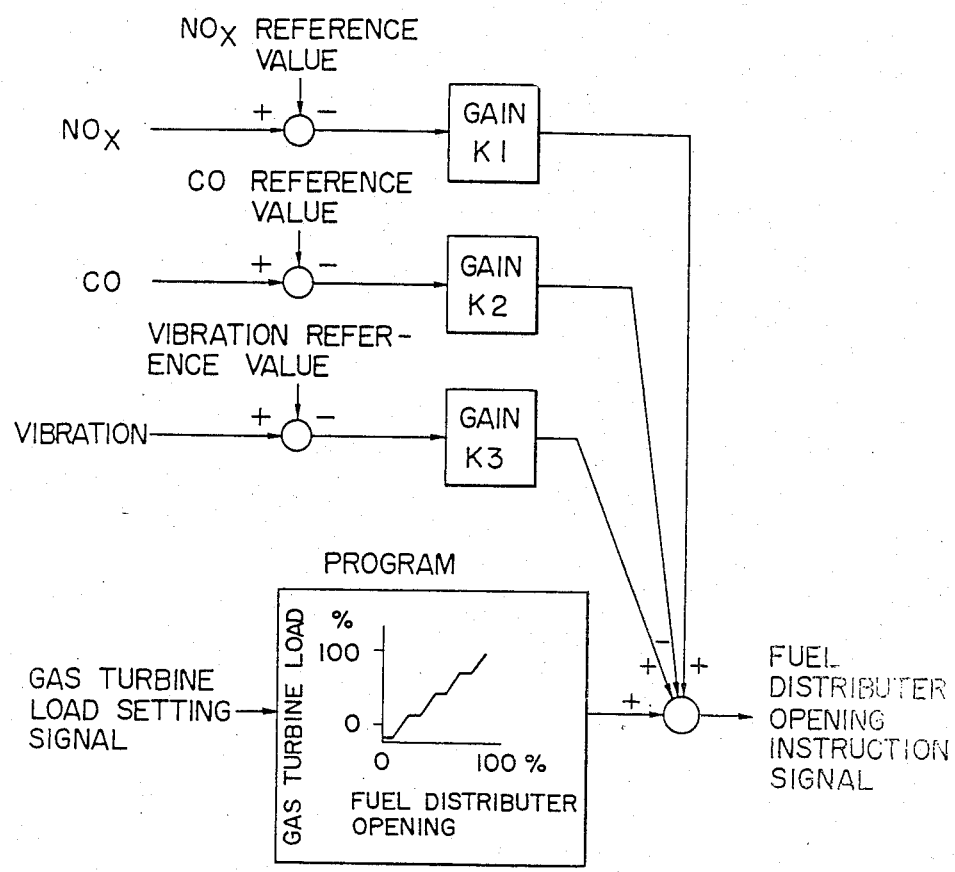
FIGS. 21~23 are diagrams to be used for explaining the operation of the third embodiment.

Although the opening control of the fuel distributor 138 may be carried out advantageously under a programmed control based on the turbine load, a control circuit as shown in FIG. 23 may be provided in the fuel distribution controller 145. In the continuously controlled ranges TA, TB, TC and TD shown in FIG. 21, the opening of the distributor 138 is not only determined by a programmed control based on the turbine load setting signal 143, but is also determined by utilizing the outputs of the pressure sensor 62, exhaust gas analyzer 115 (for detecting the $NO_x$ and CO density), and other devices as the feed-back signals. In this manner, the combustion vibration level of the turbine and $NO_x$ and CO emission in the exhaust gas can be reduced as desired.

In the above described embodiment, the number of the premixing chambers has been selected as four. However, this may be reduced to two or three or increased to five or more. In the latter case, the number of holes in the distributor 138 is increased, and by merely varying the program representing the relation between the distributor opening and the turbine load, a finer control of the gas turbine can be realized, and the $NO_x$ and CO emission can be thereby further reduced.

Figure 24:
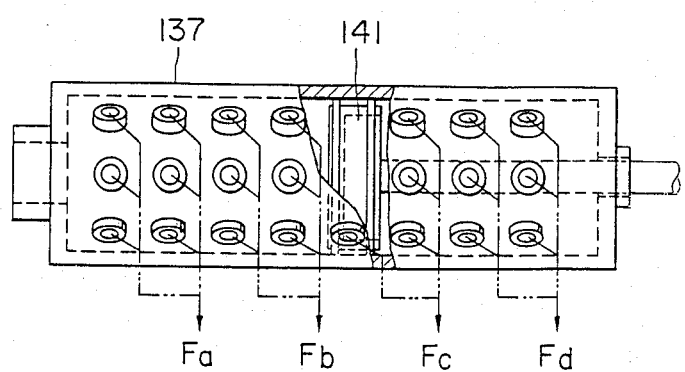
FIG. 24 is a partly fragmented side view of another example of the fuel distributor.
Figure 20:
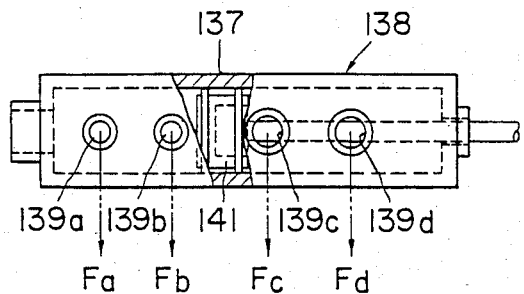
FIG. 20 is a partly fragmented side view of a fuel distributing valve used in the embodiment.

Although only one opening connected to each fuel supply system has been shown in FIG. 20 the fuel supply system may be constructed so that a plurality of holes are connected to each of the fuel supply systems FA, FB, FC and FD as shown in FIG. 24. In such a case, the plurality of holes connected to each system need not be arranged along the same plane perpendicular to the longitudinal axis of the fuel distributor. Furthermore, although a piston type actuater has been indicated in the embodiment, the actuator may be a diaphragm type, an electromotive type or the like.

A high-temperature gas delivered from the combustion cylinder 52A has been used for a feed-back control of the fuel control valve however, any of signals representing the actual output of the gas turbine can also be used. For instance, a signal representing the pressure, temperature and the like of the fuel controlled by the fuel control valve 136 may be introduced into the fuel regulator 142, and the controlled flow-rate of the fuel can be compensated for in terms of the pressure and the temperature, so that a more accurate control of the gas turbine can be realized.

In the aforementioned embodiment, since the distribution of fuel among the plurality of fuel supply systems has been carried out by the fuel distributor 138, there is no need to provide a plurality of fuel control valves, and the control programs required for controlling fuel can be substantially simplified. Furthermore, the stepwise increased amount of fuel supplied by a fuel supply system at a transfer point can be made equal to the stepwise decreased amount of fuel supplied from another fuel supply system, therefore eliminating hunting in the fuel supply, making a stable control of the gas turbine possible.

What is claimed is:

1. A gas turbine apparatus of the premixed fuel combustion type for driving a gas turbine, comprising:
   a combustion chamber for burning fuels to produce a high temperature gas for driving the gas turbine, the combustion chamber having a plurality of fuel-air pre-mixing chambers;
   a plurality of fuel supply systems for supplying fuels to the combustion chamber, each fuel supply system being connected to a respective one of the plurality of fuel-air pre-mixing chambers;
   means for mixing the fuels supplied from the plurality of fuel supply systems with high pressure air;
   means for detecting the temperature of the high temperature gas;
   means for determining the load of the gas turbine based on the detected temperature of the high temperature gas;
   a pressure sensor operatively connected to the combustion chamber for detecting vibration in the combustion chamber;
   means for sampling gas exhausted from the gas turbine;
   means for analyzing the content of nitrogen oxides ($NO_x$) and carbon monoxide (CO) in the gas exhausted from the gas turbine, the analyzing means including means for determining the densities of the analyzed nitrogen oxides and carbon monoxide; and
   means for controlling the supply of fuels from the plurality of fuel supply systems in response to the determined gas turbine load, the detected vibration in the combustion chamber and the determined density of the nitrogen oxides and carbon monoxide of the gas turbine exhaust gas, comprising:
   a computer operatively connected to the load determining means, the pressure sensor and the analyzing means so as to receive, respectively, a determined gas turbine load value, a detected vibration value and a determined density value of the nitrogen oxides and carbon monoxide, the computer also being operatively connected to the plurality of fuel supply systems so that the supply of fuel from each fuel supply system is controlled by the computer to produce patterns of fuel supply and the computer controlling the fuel supply to each fuel supply system so that, at a plurality of transfer points, each corresponding to one of a plurality of gas turbine load values, the pattern of fuel supply is changed by increasing the supply of fuel from one fuel supply system in a stepwise manner and by equally reducing the supply of fuel from another fuel supply system in a stepwise manner whereby nitrogen oxide and carbon monoxide emissions in the gas turbine exhaust gas are reduced.

2. A gas turbine apparatus as claimed in claim 1 wherein the computer comprises means for selecting the number and timing of the plurality of transfer points in response to the detected vibration and the determined density of the nitrogen oxide and the carbon monoxide of the as turbine exhaust gas.

3. A gas turbine apparatus as claimed in claim 1 wherein the computer comprises a memory for storing data on the patterns of fuel supply.

4. A gas turbine apparatus as claimed in claim 1 wherein the computer comprises means for controlling the fuel supply systems so that, at each transfer point, the increase in the supply of fuel from one fuel supply system occurs simultaneously with the reduction of the supplied fuel from the other fuel supply system.

5. A gas turbine apparatus as claimed in claim 1 wherein the computer comprises means for controlling the fuel system according to predetermined fuel patterns.

6. A gas turbine apparatus as claimed in claim 1 further comprising means for generating a negative output signal.

7. A gas turbine apparatus as claimed in claim 6, further comprising a fuel supply control valve and means for generating an output signal when the fuel supply control valve is changed from a fully closed state to an open state.

8. A gas turbine apparatus as claimed in claim 1, further comprising a fuel distributor to distribute fuels to the plurality of fuel supply systems.

9. A gas turbine apparatus as claimed in claim 8 wherein the fuel distributor comprises a cylindrical portion in which fuels are supplied to a fuel flow rate control valve, the cylindrical portion comprising a plurality of holes longitudinally spaced apart along the cylindrical portion, the plurality of holes communicating with the plurality of fuel supply systems, and a valve body longitudinally slidable along the cylindrical portion for controlling the opening of the pluralities of holes.

* * * * *